United States Patent [19]
Task et al.

[11] Patent Number: 5,926,265
[45] Date of Patent: Jul. 20, 1999

[54] LOW-LEVEL LIGHTING COMPARATOR

[75] Inventors: Harry L. Task, Dayton; Alan R. Pinkus, Bellbrook, both of Ohio

[73] Assignee: The United States of America as represented by the Secretary of the Air Force, Washington, D.C.

[21] Appl. No.: 08/837,135

[22] Filed: Apr. 14, 1997

[51] Int. Cl.$^6$ .............................. G01J 1/10; G08B 25/00
[52] U.S. Cl. ...................... 356/229; 340/815.75; 340/525
[58] Field of Search ..................................... 356/229, 230, 356/231, 232, 49, 50; 340/461, 462, 525, 815.47, 815.75, 979

[56] References Cited

U.S. PATENT DOCUMENTS 3,632,217  1/1972  Bartleson ................................. 356/230
5,198,797  3/1993  Daidoji ..................................... 340/525

*Primary Examiner*—Frank G. Font
*Assistant Examiner*—Zandra V. Smith
*Attorney, Agent, or Firm*—Bobby D. Scearce; Thomas L. Kundert

[57] ABSTRACT

An instrument and method for optically calibrating and balancing low level luminances of lighted instrument panel displays within the operator station of a vehicle is described which comprises a self-contained, calibrated luminance source and a beamsplitter for combining and juxtaposing an image of the calibrated luminance source with an image of the luminance from a lighted instrument panel display to be calibrated or balanced, whereby the images may be compared in luminance, the lighted instrument panel display being adjustable in intensity using the vehicle instrument panel light trim capability.

4 Claims, 2 Drawing Sheets

LOW-LEVEL LIGHTING COMPARATOR

RIGHTS OF THE GOVERNMENT

The invention described herein may be manufactured and used by or for the Government of the United States for all governmental purposes without the payment of any royalty.

BACKGROUND OF THE INVENTION

The present invention relates generally to systems and methods for calibrating or balancing low level luminance sources, and more particularly to an optical instrument for accurately calibrating and balancing low level luminances of lighted instrument panel displays.

Calibration, adjustment and maintenance of instrument and panel lighting within a vehicle operator control station (such as a modem aircraft cockpit) is often difficult because the instrument lighting is typically functionally grouped and controlled by a master dimmer circuit. Differences among various instruments and panels make it difficult to keep individual instruments within a group at the same luminance level over the entire variable range. For example, luminances of a bank of instruments balanced at about 1 fL (a dusk setting) may be totally unbalanced when set to 0.001 fL (a dark night setting). Existing instrument panel lighting systems having instrument luminance trim capability have no calibrated standard or standardized test procedure and are adjusted manually at night through iterative subjective visual adjustments or with the use of a portable photometer, which are time consuming and expensive procedures and are sufficiently imprecise as to prevent assessment of the compatibility of a lighting system used in conjunction with an infrared-sensitive night vision device (NVD) (e.g., night vision goggles).

The invention solves or substantially reduces in critical importance problems with existing luminance level comparator devices and methods as just suggested by providing a small, self-contained, calibrated, relatively low-cost unit that can be easily used by maintenance personnel to balance instrument and panel lighting equipped with light trimming capability. The invention may be used to evaluate the degree to which the lighting is compatible with NVD use. The selectable colors and luminance ranges permit balancing luminance levels to MIL-L-85762 specified levels (0.1 fL, green light for instruments and panels) and viewed with NVDs for possible interference (non-compatibility) with improper spectral characteristics.

The invention may be used for adjustment of any standard or NVD instrumented, low-light level illuminated vehicle operator control station within cars, trucks, tanks, ships, etc, and may find particular use by aircraft manufacturers to quickly balance cockpit illumination, and could be used on a factory assembly line as an economical, quick check/calibration of manufactured devices having self-contained adjustable lighting systems (e.g., lighted instruments or panels).

It is therefore a principal object of the invention to provide an instrument and method for optically calibrating and balancing low level luminance sources.

It is a further object of the invention to provide an instrument and method for the accurate optical calibration and balancing of low level instrument panel luminances within a vehicle operator station.

It is another object of the invention to provide an optical instrument and method for enhancing visualization of a lighted vehicle instrument and instrument panel display under low level luminance conditions.

It is yet a further object of the invention to provide an instrument for evaluating NVD compatibility with low luminance levels of lighted instrument panel displays.

These and other objects of the invention will become apparent as a detailed description of representative embodiments proceeds.

SUMMARY OF THE INVENTION

In accordance with the foregoing principles and objects of the invention, an instrument and method for optically calibrating and balancing low level luminances of lighted instrument panel displays within the operator station of a vehicle is described which comprises a self-contained, calibrated luminance source and a beamsplitter for combining and juxtaposing an image of the calibrated luminance source with an image of the luminance from a lighted instrument panel display to be calibrated or balanced, whereby the images may be compared in luminance, the lighted instrument panel display being adjustable in intensity using the vehicle instrument panel light trim capability.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
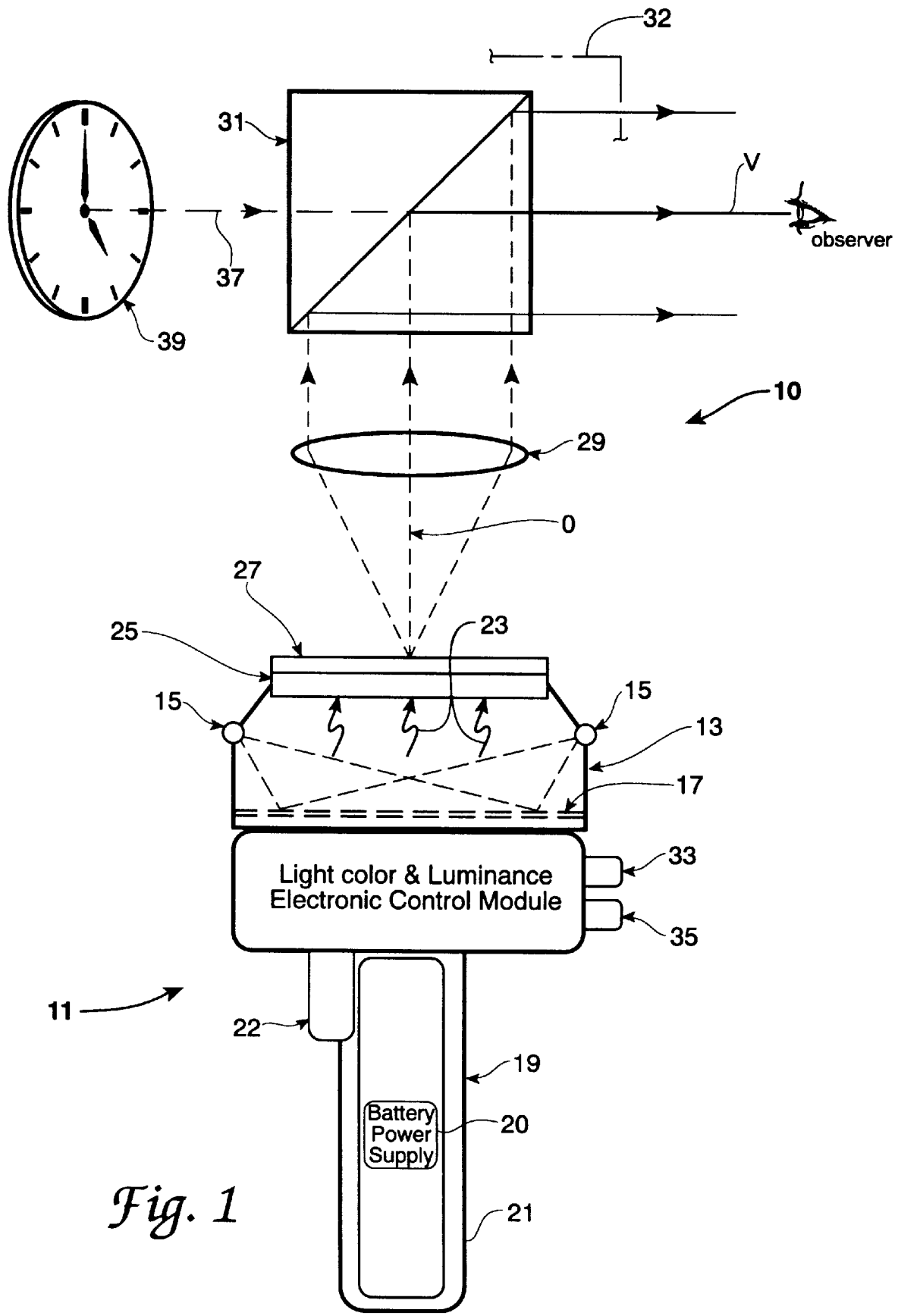
FIG. 1 is a schematic block diagram of essential components of a representative luminance comparator according to the invention.

Referring now to the drawings, FIG. 1 shows a schematic block diagram of the essential components of a representative luminance comparator 10 according to the invention. A principal element of comparator 10 is a calibrated standard light source 11. Source 11 in the representative embodiment shown in FIG. 1 includes a light diffusion chamber 13 including one or more light-emitting diodes (LEDs) 15 disposed in the walls defining chamber 13 at locations to substantially uniformly illuminate surface 17 forming one end of chamber 13. It may be noted at the outset that alternative light sources other than LEDs may be used within comparator 10, such as one or more incandescent or fluorescent sources or other source as might be selected by one skilled in the field of the invention practicing the invention, the specific source selection not considered limiting of the invention. Power source 19 is disposed adjacent chamber 13 to provide electrical power to LEDs 15, and may for portability of comparator 10 comprise a battery source 20 disposed within housing 21 as suggested in FIG. 1. Housing 21 may enclose driver circuit electronics for selectively regulating luminance levels for LEDs 15 and may also include the necessary electronics and wiring for alternative connection to an external (a.c. or d.c.) power source through a power cord (not shown). A trigger type momentary on-off switch 22 for selectively controlling power source 20 may be located conveniently within housing 21 as suggested in FIG. 1.

Surface 17 is preferably a flat white diffuser/reflector surface which reflects a beam of diffuse calibrated illumination 23, substantially uniform in intensity over a cross section of the beam, along optical axis O through a white translucent light diffuser screen 25 and removable image mask 27. Imaging lens 29 is disposed along optical axis O in order to image rumination 23 from light source 11 onto an optical combiner (beamsplitter) 31 also disposed along axis O. Light source 11, diffuser screen 25, mask 27, lens 29 and beamsplitter 31 may all be contained in suitable housing 32 (illustrated in FIG. 1 by peripheral broken line).

LEDs 15 may preferably be the combination (self-contained) red-green-blue (RGB) type package housing three separate red, green and blue emitters. Incandescent, miniature fluorescent, separate LEDs or two-color LEDs (red and green) may also be used to produce illumination 23. LEDs 15 may be operatively connected to and controlled by rotary color selection switch 33 and rotary luminance selection switch 35 so as to be individually selectable for red, green or blue only, plus combinations, to produce yellow (green+red) or white (red+green+blue) (representative LEDs 15 are available from Panasonic, model LN05202P, Digi-key Corp, Thief River Falls Minn., or Siemens, model LSPB T670, Siemens Components, Cupertino Calif.). Green is highly desirable for use in conjunction with use of an NVD compatible lighted cockpit. Yellow and red may correspond to caution and warning lamps, respectively. Existing aircraft may use white light (non-NVD compatible), or red or even blue instrument and panel lighting.

Optical combiner 31 is disposed along axis O to optically combine and juxtapose images of illumination 23 projected along axis O and of illumination 37 projected along viewing axis V from a selected externally located lighted source 39 (in the form of an instrument panel display or the like). The spatially juxtaposed images of light source 39 and calibrated light source 11 may be viewed along axis V by an observer, as suggested in FIG. 1, at the same optical distance, which allows accurate comparison of the instrument (source 39) illumination 37 with the calibrated light source 11 illumination and the instrument illumination may be adjusted accordingly using any available instrument panel light trim capability within the vehicle.

Image mask 27 is disposed over diffuser screen 25 and is configured to define an image shape corresponding to the shape of a selected instrument or panel light source 39 for luminance level comparative purposes as described more fully below. Various shaped interchangeable masks 27 may be used to present a reference pattern (lighted alpha-numeric display or other instrument display shape) corresponding to any selected source 39 pattern, such as those shown in FIG. 3a–d, respectively, as a small circular light source, panel label, large light source and circular instrument indicia. Imaging lens 29 produces a virtual image of the masked image at an optical distance equal to the physical distance from source 39 to optical combiner 31, and the image is projected into optical combiner 31 and viewed by the observer in juxtaposition with the pattern defined by source 39. Table 1 lists several candidate luminance values and some appropriate associated color and application combinations. This optical image distance can be adjusted by selectively spacing lens 29 from light source 11.

TABLE 1

| Standard Value (fL) | Color* | Application** |
|---|---|---|
| 0.001 | WH, G, R | I, P, H, M, N |
| 0.01 | WH, G, R | I, P, H, M, N |
| 0.1 | WH, G, R | I, P, H, M, N |
| 0.5 | R, Y | C, W |

*WH = white. G = green. R = red. Y = yellow.
**I = instruments. P = panels. H = head-up displays. M = multifunction displays. N = NVDC lighting. C = caution. W = warning In the practice of the invention in calibrating a lighted instrument panel display juxtaposed with calibrated light source 11, the proper color and pre-calibrated luminance levels (e.g., 0.5, 0.1, 0.01 or 0.001 fL) are manually selected (switches 33,35), and the appropriate mask 27 is installed in position as suggested above. Comparator 10 is held nominally about 20 inches from a panel light source 39 to be adjusted and lens 29 is placed an equivalent distance. The observer then focuses on instrument panel light source 39 through optical combiner 31, energizes comparator 10 (switch 22) and compares the juxtaposed images of sources 11 and 39. The two images are then visually matched to the same luminance level by adjusting the luminance level of instrument panel light source 39 using the balancing circuits provided within the vehicle.

Figure 2A:
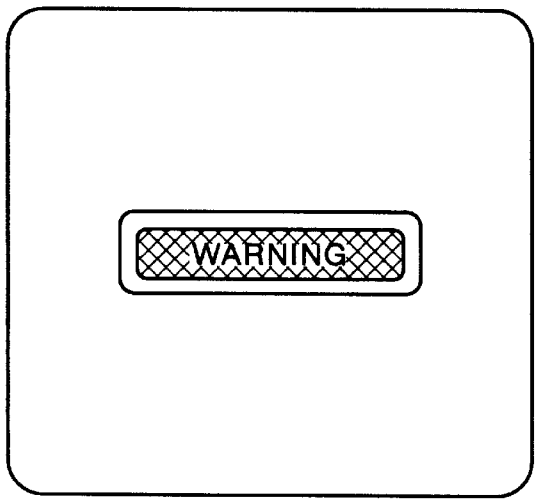
FIG. 2a is a drawing of a transilluminated aircraft warning light as viewed through the FIG. 1 comparator wherein the display background luminance is below calibrated standard surround luminance.
Figure 2B:
FIG. 2b is a drawing of the aircraft warning light of FIG. 2a as viewed through the FIG. 1 comparator wherein the background and standard are of equal luminance.
Figure 3A:
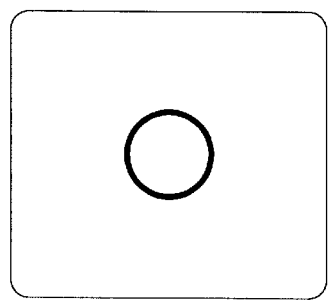
FIGS. 3a–d show example image mask shapes for light balancing using the FIG. 1 comparator for, respectively, a small circular light source, a panel label, a larger light source, and a circular instrument indicia.
Figure 3B:
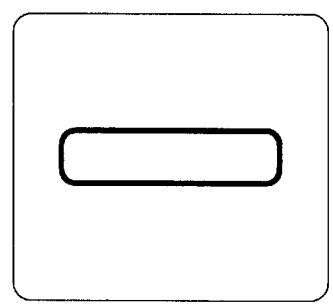
Figure 3C:
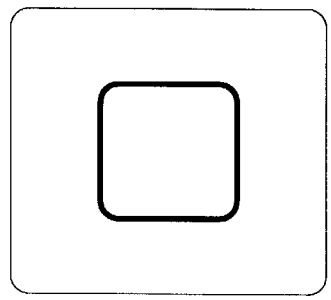
Figure 3D:
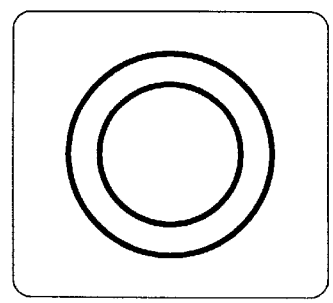

FIGS. 2a and 2b present views as seen by the observer through optical combiner 31 of a transilluminated aircraft warning light, where the standard illuminant is the surround and the black area is the mask which allows the view of the lighted display, FIG. 2a being a view of the display where background luminance is below calibrated standard surround luminance, and FIG. 2b being a view of the display where background and standard are equal luminance.

The invention therefore provides a small, self-contained, portable, low-cost, color-selectable optical instrument for accurately calibrating and balancing low level instrument panel luminances. It is understood that modifications to the invention may be made as might occur to one with skill in the field of the invention within the scope of the appended claims. All embodiments contemplated hereunder which achieve objects of the invention have therefore not been shown in complete detail. Other embodiments may be developed without departing from the spirit of the invention or from the scope of the appended claims.

We claim:

1. An instrument for use in optically balancing luminance levels of low level luminance instrument panel displays, comprising:

(a) a luminance source, said luminance source including a light diffusion chamber having in one end thereof a substantially flat light diffusing surface for reflecting substantially uniform diffuse illumination along an optical axis, and at least one light source disposed within said chamber for substantially uniformly illuminating said light diffusing surface;

(b) a source of electrical power operatively connected to said at least one light source;

(c) means for controlling the intensity of said at least one light source and the intensity of said substantially uniform diffuse illumination;

(d) a light diffuser screen and removable image mask disposed along said optical axis, said image mask defining an image shape corresponding to the shape of a selected low level luminance instrument panel display;

(e) an imaging lens disposed along said optical axis for generating a first image of said substantially uniform diffuse illumination along said optical axis;

(f) a beamsplitter disposed along said optical axis for optically combining and juxtaposing said first image of said substantially uniform diffuse illumination with a second image of said low level luminance instrument panel display for viewing along a viewing axis, whereby the luminance level of said substantially uniform diffuse illumination may be compared with the luminance level of said low level luminance instrument panel display.

2. The instrument of claim 1 wherein said at least one light source is selected from the group consisting of a light emitting diode, an incandescent source and a fluorescent source.

3. The instrument of claim 2 comprising at least three light emitting diodes of different colors and a rotary color selection switch and a rotary luminance selection switch operatively connected to said at least three light emitting diodes for selectively controlling the color of said substantially uniform diffuse illumination.

4. The instrument of claim 1 wherein said luminance level of said luminance source is preselected at a level selected from the group consisting of 0.5, 0.1, 0.01 and 0.001 fL.

* * * * *